(12) United States Patent
Sugimoto (10) Patent No.: US 7,561,718 B2
(45) Date of Patent: Jul. 14, 2009

(54) IMAGE SEARCH APPARATUS FOR IMAGES TO BE DETECTED, AND METHOD OF CONTROLLING SAME

(75) Inventor: Masahiko Sugimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 680 days.

(21) Appl. No.: 11/266,220

(22) Filed: Nov. 4, 2005

(65) Prior Publication Data

US 2006/0098875 A1    May 11, 2006

(30) Foreign Application Priority Data

Nov. 5, 2004  (JP)  ............................. 2004-321394
Sep. 2, 2005  (JP)  ............................. 2005-254686

(51) Int. Cl.
    *G06K 9/00*  (2006.01)
(52) U.S. Cl. ..................................... 382/103
(58) Field of Classification Search ................. 382/100, 382/103, 118, 192, 309; 348/77, 78
    See application file for complete search history.

(56) References Cited

U.S. PATENT DOCUMENTS

2006/0126938 A1* 6/2006 Lee et al. .................... 382/190
2006/0257004 A1* 11/2006 Chen ........................... 382/103

FOREIGN PATENT DOCUMENTS

JP    2003-92699 A    3/2003

* cited by examiner

*Primary Examiner*—Andrew W Johns
(74) *Attorney, Agent, or Firm*—McGinn IP Law Group, PLLC (57) ABSTRACT

If a target-image portion to be detected is detected anew, an evaluation value of this target-image portion is calculated. If the target-image portion is detected anew, it is determined whether the number of target-image portions has exceeded n owing to such detection. If, in a case where n has been exceeded, information concerning a target-image portion having an evaluation value smaller than that of the newly detected target-image portion has been stored, then the information having this evaluation value is deleted from a list and the information concerning the newly detected target-image portion is stored in the list. Since the number of items of information stored in the list will not exceed n, it is possible to avoid a malfunction that can occur if processing is executed following storage of a large number of items of information.

9 Claims, 10 Drawing Sheets

*Fig. 2*

| | FEATURE | VALUE | SCORE |
|---|---|---|---|
| 1 | PIXEL VALUE AT POSITION (x1,y1) IN SEARCH AREA | v_1 | p_1 |
| 2 | PIXEL VALUE AT POSITION (x2,y2) IN SEARCH AREA | v_2 | p_2 |
| : | : | : | : |
| i | PIXEL VALUE AT POSITION (x1,y1) IN SEARCH AREA IN CASE WHERE FILTER PROCESSING HAS BEEN APPLIED TO IMAGE IN SEARCH AREA | v_i | p_i |
| : | : | : | : |
| n | DIFFERENCE BETWEEN PIXEL VALUE AT POSITION (x1,y1) IN SEARCH AREA AND PIXEL VALUE AT POSITION (x2,y2) IN SEARCH AREA | v_n | p_n |

TARGET-IMAGE INFORMATION LIST

| RANK | ORDER IN WHICH DETECTED | POSITION ON IMAGE (x, y) | SIZE ON IMAGE (WIDTH, HEIGHT) | OVERALL SCORE |
|---|---|---|---|---|
| 1 | 10 | 10, 10 | 10, 10 | S10 |
| 2 | 12 | 12, 12 | 12, 12 | S12 |
| 3 | 5 | 5, 5 | 5, 5 | S5 |
| 4 | 7 | 7, 7 | 7, 7 | S7 |

TARGET-IMAGE INFORMATION LIST (BEFORE UPDATING)

| RANK | ORDER IN WHICH DETECTED | POSITION ON IMAGE (x, y) | SIZE ON IMAGE (WIDTH, HEIGHT) | OVERALL SCORE |
|---|---|---|---|---|
| 1 | 10 | 10, 10 | 10, 10 | S10 |
| 2 | 5 | 5, 5 | 5, 5 | S5 |
| 3 | 7 | 7, 7 | 7, 7 | S7 |
| 4 | 2 | 2, 2 | 2, 2 | S2 |

Fig. 9

NEW TARGET-IMAGE INFORMATION

| RANK | ORDER IN WHICH DETECTED | POSITION ON IMAGE (x, y) | SIZE ON IMAGE (WIDTH, HEIGHT) | OVERALL SCORE |
|---|---|---|---|---|
| N | 12 | 12, 12 | 12, 12 | S12 |

Fig. 10

TARGET-IMAGE INFORMATION LIST (BEFORE UPDATING)

| RANK | ORDER IN WHICH DETECTED | POSITION ON IMAGE (x, y) | SIZE ON IMAGE (WIDTH, HEIGHT) | PROVISIONAL OVERALL SCORE | BRIGHTNESS OF TARGET IMAGE | OVERALL SCORE |
|---|---|---|---|---|---|---|
| 1 | 10 | 10, 10 | 10, 10 | S10 | Y10 | T10 |
| 2 | 5 | 5, 5 | 5, 5 | S5 | Y5 | T5 |
| 3 | 7 | 7, 7 | 7, 7 | S7 | Y7 | T7 |
| 4 | 2 | 2, 2 | 2, 2 | S2 | Y2 | T2 |

Fig. 11

NEW TARGET-IMAGE INFORMATION

| RANK | ORDER IN WHICH DETECTED | POSITION ON IMAGE (x, y) | SIZE ON IMAGE (WIDTH, HEIGHT) | PROVISIONAL OVERALL SCORE | BRIGHTNESS OF TARGET IMAGE | OVERALL SCORE |
|---|---|---|---|---|---|---|
| N | 12 | 12, 12 | 12, 12 | S12 | Y12 | T12 |

Fig. 12

TARGET-IMAGE INFORMATION LIST (AFTER UPDATING)

| RANK | ORDER IN WHICH DETECTED | POSITION ON IMAGE (x, y) | SIZE ON IMAGE (WIDTH, HEIGHT) | PROVISIONAL OVERALL SCORE | BRIGHTNESS OF TARGET IMAGE | OVERALL SCORE |
|---|---|---|---|---|---|---|
| 1 | 10 | 10, 10 | 10, 10 | S10 | Y10 | T10 |
| 2 | 12 | 12, 12 | 12, 12 | S12 | Y12 | T12 |
| 3 | 5 | 5, 5 | 5, 5 | S5 | Y5 | T5 |
| 4 | 7 | 7, 7 | 7, 7 | S7 | Y7 | T7 |

*Fig. 13*

IMAGE SEARCH APPARATUS FOR IMAGES TO BE DETECTED, AND METHOD OF CONTROLLING SAME

BACKGROUND OF THE INVENTION

1. Field of the Invention

This invention relates to an image search apparatus for finding an image of interest (referred to below as a "detection-target image") in an image subjected to detection.

2. Description of the Related Art

There are instances where search processing is executed for finding a face image portion or redeye image portion, etc., in an image of a subject obtained by photographing a person. By finding the face image portion or redeye image portion, the found image portion can be corrected. Further, there are digital cameras in which the shooting mode can be switched to portrait mode automatically by finding a face image portion in the image of a subject (see the specification of Japanese Patent Application Laid-Open No. 2003-92699).

If the number of human images present in the image of a subject can be ascertained in such a digital camera, control is exercised in such a manner that all of these individuals will fall within the depth of field.

When there are a very large number of individuals (face images) detected, however, there are instances where a malfunction will occur if all of these individuals are made to fall within the depth of field.

SUMMARY OF THE INVENTION

Accordingly, an object of the present invention is to avoid malfunction in a case where a detection-target image is found in an image subjected to detection.

According to a first aspect of the present invention, the foregoing object is attained by providing an image search apparatus for searching for a detection-target image, comprising: a detection device for finding a detection-target image portion, based upon an evaluation value indicating degree of detection-target likeliness, in an image subjected to detection; a storage device for storing information concerning the detection-target image portion that has been found by the detection device; a determination device for determining whether a number of detection-target image portions that have been found by the detection device is equal to or greater than a prescribed number; and an erasing device, responsive to a determination by the determination device that the number is equal to or greater than the prescribed number, for erasing detection-target image portions, which have been stored in the storage device, in order of increasing reference value that is based upon a prescribed criterion in such a manner that the number of detection-target image portions that have been found by the detection device will fall below the prescribed number.

The first aspect of the present invention also provides a control method suited to the above-described image search apparatus. Specifically, there is provided a method of controlling an image search apparatus for searching for a detection-target image, the apparatus having a detection device for finding a detection-target image portion, based upon an evaluation value indicating degree of detection-target likeliness, in an image subjected to detection, and a storage device for storing information concerning the detection-target image portion that has been found by the detection device, the method comprising the steps of: determining whether a number of detection-target image portions that have been found by the detection device is equal to or greater than a prescribed number; and in response to a determination that the number is equal to or greater than the prescribed number, erasing detection-target image portions, which have been stored in the storage device, in order of increasing reference value that is based upon a prescribed criterion in such a manner that the number of detection-target image portions that have been found by the detection device will fall below the prescribed number.

In accordance with the first aspect of the present invention, a detection-target image portion is found, based upon an evaluation value indicating degree of detection-target likeliness, in an image subjected to detection (which may be one frame of an image or several frames of an image). Information concerning the found detection-target image portion (such information as size and position of the detection-target image portion) is stored. It is determined whether the number of found detection-target image portions is equal to or greater than a prescribed number. If the found number is equal to or greater than the prescribed number, the stored information concerning the detection-target image portions is erased in order of increasing reference value, which is based upon a prescribed criterion, in such a manner that the number will fall below the prescribed number.

The number of items of stored information concerning the detection-target image portions is limited to a prescribed number. As a result, it is possible to avoid a malfunction that can occur if a large number of detection-target image portions have been found.

It may be so arranged that if the number of detection-target image portions surpasses the prescribed number owing to discovery anew of a detection-target image portion, it is determined whether the evaluation value of the newly found detection-target image portion is larger than the smallest evaluation values among the evaluation values of detection-target image portions that have already been found. In response to a determination that the evaluation value is larger, the information concerning the newly found detection-target image portion is stored and the information concerning the detection-target image portion having the smallest evaluation value among the evaluation values of the already found detection-target image portions is erased. Further, if the evaluation value of the newly found detection-target image portion is smaller than the minimum evaluation value among the evaluation values of the already found detection-target image portions, the information concerning this found detection-target image portion would not be stored.

The evaluation value is based upon at least one among the size, brightness, saturation, position, orientation, inclination and hue (inclusive of an index that corresponds to hue) of the found detection-target image portion, by way of example. Further, the detection-target image portion is a face image or redeye image, by way of example.

According to a second aspect of the present invention, the foregoing object is attained by providing an image search apparatus for searching for a detection-target image, comprising: a detection device for finding a detection-target image portion in an image subjected to detection; a determination device for determining whether a number of detection-target image portions that have been found by the detection device is equal to a prescribed number; a storage control device, responsive to a determination by the determination device that the number is not equal to the prescribed number, for storing information, which concerns the detection-target image portion that has been found by the detection device, in a storage device; and a detection processing control device, responsive to a determination by the determination device that the number is equal to the prescribed number, for halting processing executed in the detection device.

The second aspect of the present invention also provides a control method suited to the above-described image search apparatus. Specifically, there is provided a method of controlling an image search apparatus, comprising the steps of: finding a detection-target image portion in an image subjected to detection; determining whether a number of detection-target image portions that have been found is equal to a prescribed number; in response to a determination that the number is not equal to the prescribed number, storing information, which concerns the detection-target image portion that has been found, in a storage device; and in response to a determination that the number is equal to the prescribed number, halting detection processing.

According to the second aspect of the present invention, a detection-target image portion is found in an image subjected to detection, and it is determined whether the number of found detection-target image portions is equal to a prescribed number. If the number is not equal to the prescribed number, information concerning the found detection-target image portion is stored. If the number is equal to the prescribed number, then processing for finding detection-target image portions is halted.

If the number of found detection-target image portions is equal to or greater than the prescribed number, processing for finding detection-target image portions is halted. As a result, it is possible to avoid a malfunction that can occur if a large number of detection-target image portions have been found.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described in detail with reference to the drawings.

Figure 1:
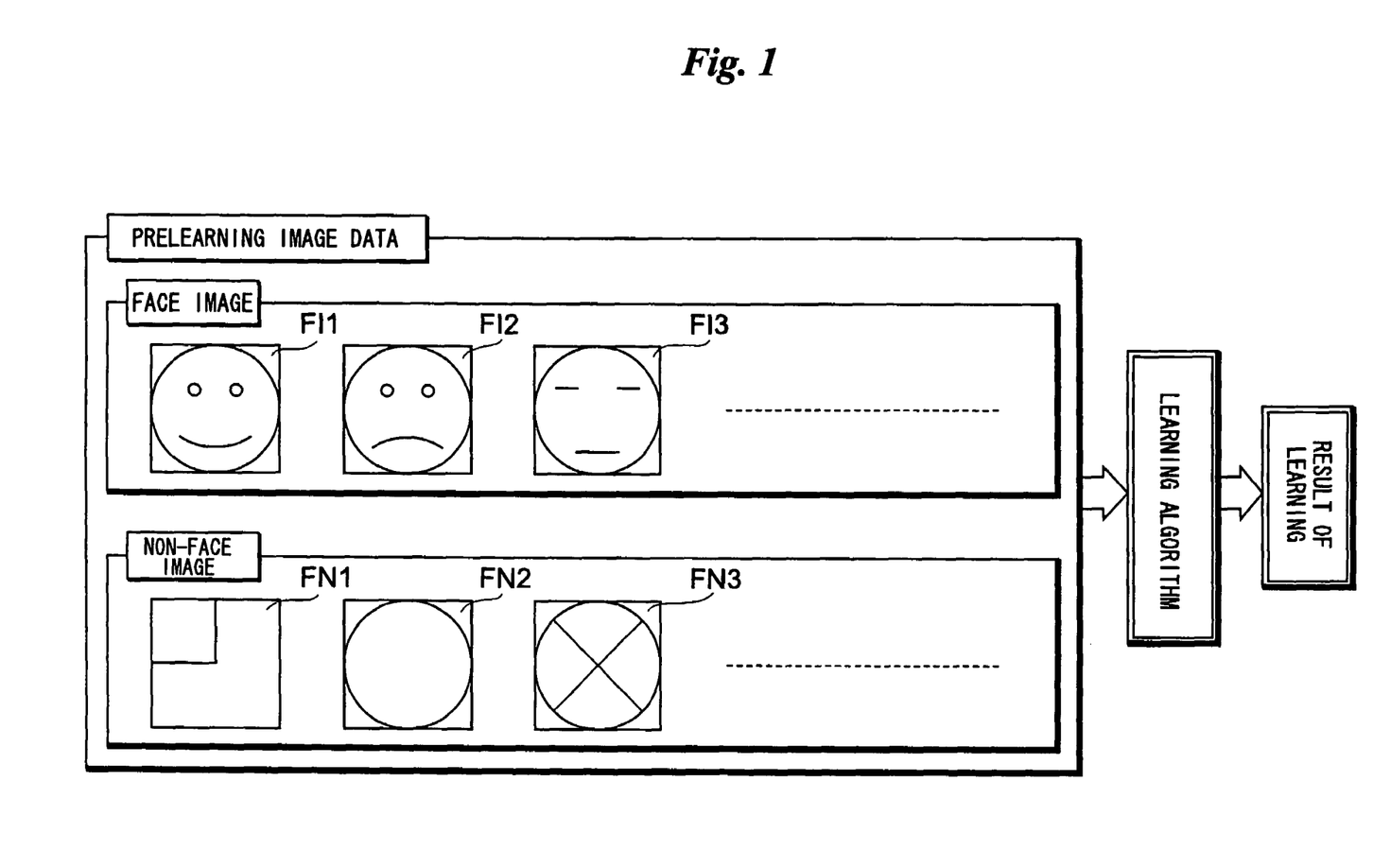
FIG. 1 illustrates the manner in which results of learning are created.

FIG. 1 illustrates the manner in which result of learning utilized in the detection of a face image is generated in this embodiment.

Face image data and non-face image data is used as pre-learning image data. Data representing images FI1, FI2, FI3, etc. of various faces is used for the face image data. Data representing non-face images FN1, FN2, FN3, etc., namely images which resemble face images but which are not face images, is used for the non-face image data.

Result of learning for determining whether an image is a face image or not is obtained in accordance with a prescribed learning algorithm using these items of prelearning image data. The obtained result of learning is stored in a digital still camera.

Figure 2:
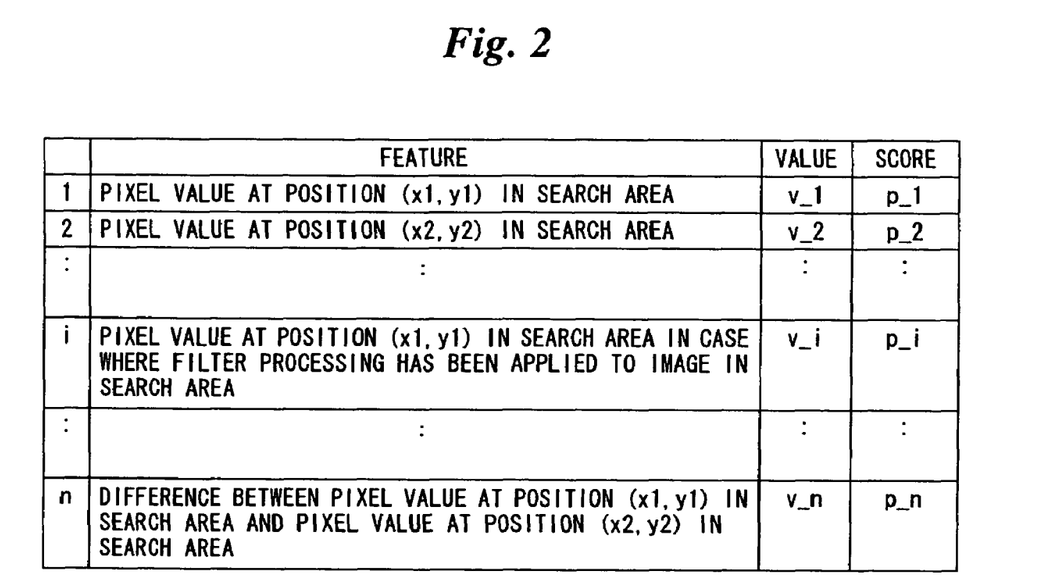
FIG. 2 is a table illustrating an example of results of learning.

FIG. 2 illustrates an example of a table representing result of learning.

Result of learning has been stored as pixel values at prescribed positions within a search area, pixel values at prescribed positions within the search area in a case where filter processing has been applied to an image within the search area, the differences between pixel values, and the scores of these values. A corresponding score (which may be positive or negative) is obtained from a value such as a certain pixel value, and an overall score obtained by accumulating the obtained scores becomes an evaluation value indicative of the facial likeliness of an image within the search area (i.e., the degree to which the image within the search area is face-like).

Figure 3:
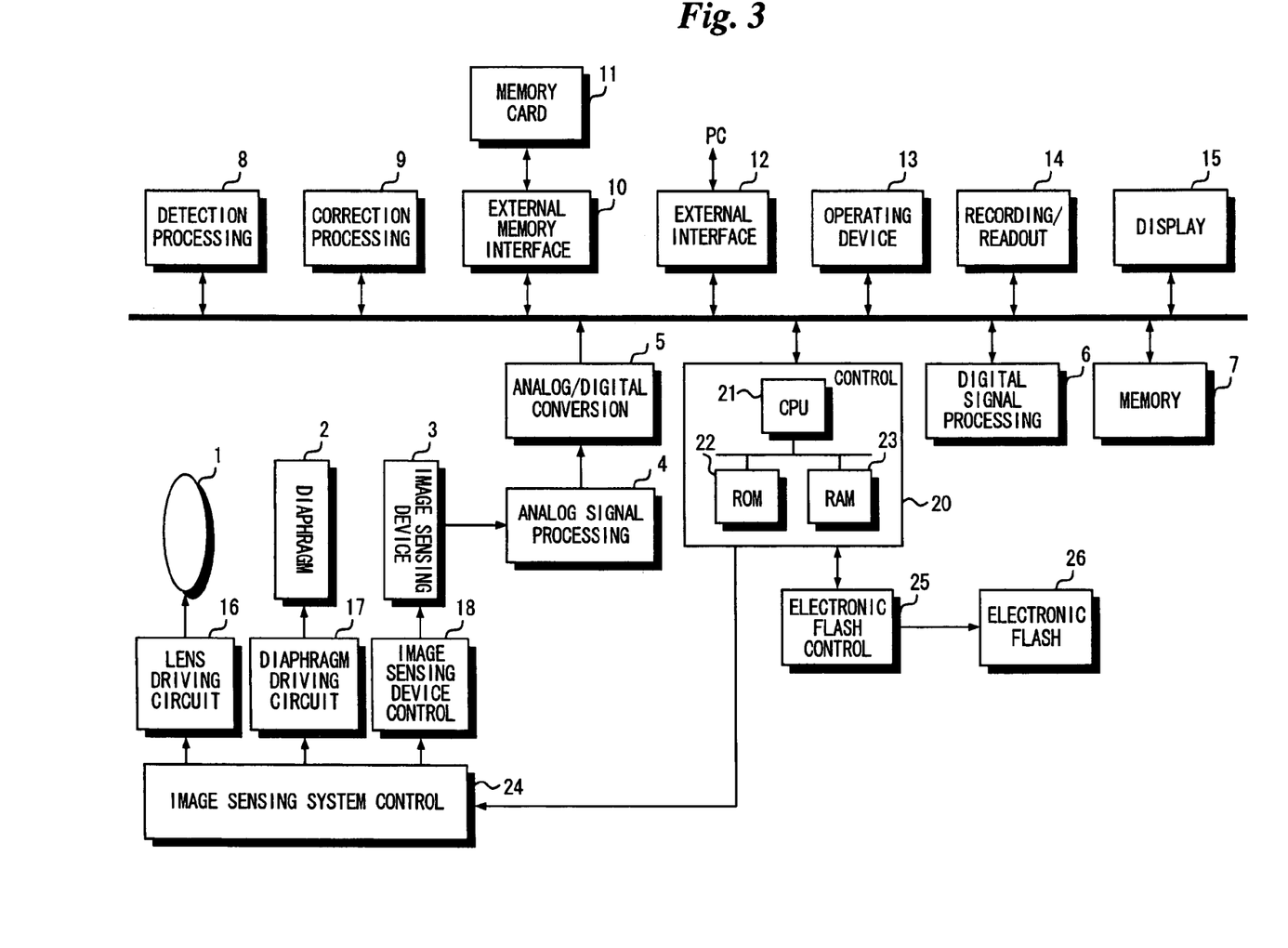
FIG. 3 is a block diagram illustrating the electrical structure of a digital still camera.

FIG. 3 is a block diagram illustrating the electrical structure of a digital still camera.

Processing for detecting face images can be executed in the digital still camera according to this embodiment. In the digital still camera according to this embodiment, information concerning four images (it goes without saying that the number may be other than four) having the highest degree of facial likeliness among face images that have been detected can be stored. This makes it possible to avoid a malfunction that can occur if a large number of face images are detected. The details will become evident from the description that follows.

The overall operation of the digital still camera is controlled by a control circuit 20.

The control circuit 20 includes a CPU 21, a ROM 22 and a RAM 23 interconnected by a bus. Content of processing (name of processing) of image processing executed in the digital still camera, the version of this image processing, other necessary data and an image processing program, etc., have been stored in the ROM 22. The RAM 23 temporarily stores necessary data and image files, etc., that have been read from a memory card 11.

The digital still camera includes an operating device 13 having a shutter-release button and a mode setting dial (various modes such as an image sensing mode, playback mode and detection mode can be set by the mode setting dial). An operating signal that is output from the operating device 13 is input to the control circuit 20. A personal computer can be connected to the digital still camera. The digital still camera is provided with an external interface 12 for this purpose.

The digital still camera includes an image sensing lens 1, a diaphragm 2 and an image sensing device 3 such as a CCD.

The lens position of the lens 1 is controlled by a lens driving circuit 16. The aperture of the diaphragm 2 is controlled by a diaphragm driving circuit 17. A light beam representing the image of a subject is condensed by the lens 1 and impinges upon the image sensing device 3 such as a CCD through the diaphragm 2. A light image representing the image of the subject is formed on the photoreceptor surface of the image sensing device 3 controlled by a control circuit 18. The lens driving circuit 16, diaphragm driving circuit 17 and control circuit 18 for the image sensing device are controlled by a control circuit 24 for the image sensing system.

If the image sensing mode is set by the mode setting dial 20, the image sensing device 3 is controlled by a control circuit 13 for the image sensing device 3, which outputs a video signal representing the image of the subject. The video signal is subjected to analog signal processing such as correlated double sampling in an analog signal processing circuit 4. The video signal that is output from the analog signal processing circuit 4 is converted to digital image data in an analog/digital converting circuit 5 and the digital image data is input to a digital signal processing circuit 6. Digital signal processing such as a gamma correction, automatic tone correction and automatic white balance adjustment is executed in the digital signal processing circuit 6.

The image data that has been output from the digital signal processing circuit 6 is applied to a display unit 15 via a memory 7. The image of the subject is displayed on the display screen of the display unit 15.

If the shutter-release button is pressed, the subject is imaged again and image data representing the image of the subject is obtained in a manner similar to that described above. The image data is supplied from the digital signal processing circuit 6 to the memory 7, where the data is stored temporarily. The image data is read out of the memory 7 and is recorded on the memory card 11, which is connected to an external memory interface 10, by a recording/readout control circuit 14. It goes without saying that data compression may applied to the image data as necessary and that the compressed image data may be recorded on the memory card 11.

If a playback mode is set by the mode setting dial, image data representing the image of the subject is read out of the memory card 11 by the recording/readout control circuit 14. The image data that has been read out is applied to the memory 7, where the data is stored temporarily. The image data is read out of the memory 7 and applied to the display unit 15. The image represented by the image data that has been recorded on the memory card 11 is displayed on the display screen of the display unit 15.

If a correction mode is set by the mode setting dial, in this embodiment the detection of a face image is performed by a detection processing circuit 8 in the manner described above. Information concerning a face image found in the detection processing circuit 8 is stored in the memory 7. The color, etc., of the found face image is corrected in a correction processing circuit 9. A redeye image can also be detected in the detection processing circuit 8. If a redeye image has been detected, the redeye image can be corrected in the correction processing circuit 9.

Of course, it need not be so arranged that detection of a face image is performed only in a case where the correction mode has been set. For example, it may be so arranged that detection of a face image in this embodiment is performed in cases where the image sensing mode and playback mode have been set. (As will be described later, face image detection includes processing for storing, erasing and updating information contained in a target-image information list.) Furthermore, in a case where actual image sensing is performed by pressing the shutter-release button, it goes without saying that detection may be performed in image sensing that precedes actual image sensing or in actual image sensing itself.

Figure 4:
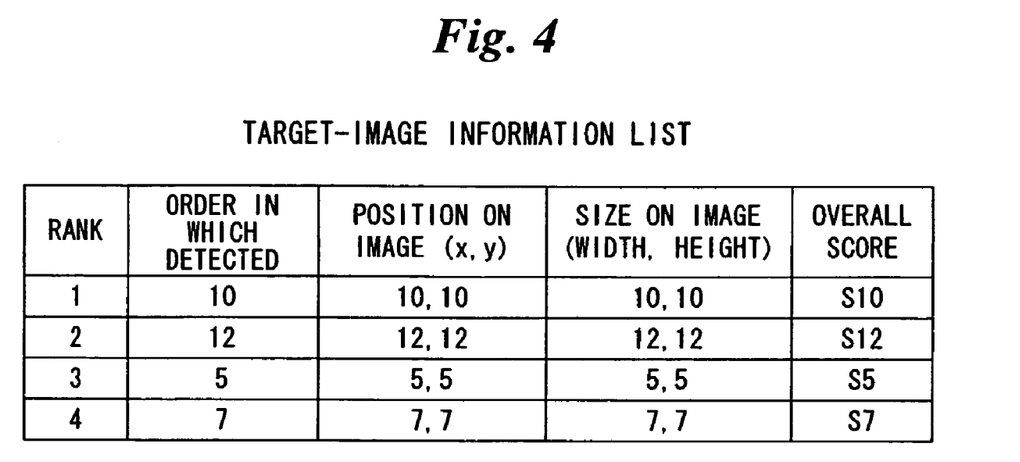
FIG. 4 illustrates an example of a list of items of target-image information.

FIG. 4 illustrates a list indicating information concerning face images (target-image portions) that have been found by the detection processing circuit 8. This list is stored in the memory 7.

The target-image information list contains ranking indicating evaluation values in order of decreasing value, each evaluation value serving as degree of facial likeliness of a face image of a target-image portion detected from an image subjected to detection of target-image portions (images to be detected); the order in which target-image portions have been detected; position of the detected target-image portion on the image in the image subjected to detection; size of the detected target-image portion on the image subjected to detection; and overall score indicating the evaluation value.

The information contained in the target-image information list is ranked in order of decreasing overall score. The overall scores contained in the target-image information list are related as follows: S10>S12>S5>S7.

In the digital still camera according to this embodiment, information concerning the four highest ranking target-image portions is stored in the target-image information list. If the overall score of information concerning a newly detected target-image portion is higher than the score of information that has already been stored in the target-image information list, the information concerning this newly detected target-image portion is stored in the list and information concerning the target-image portion having the lowest score among the scores of already stored information is deleted from the list. With regard to a target-image portion (face image) having information that has been stored in the list, the face image is corrected in the correction processing circuit 9 and the image data that represents the image containing this corrected face image is recorded on the memory card 11, by way of example.

Figure 5:
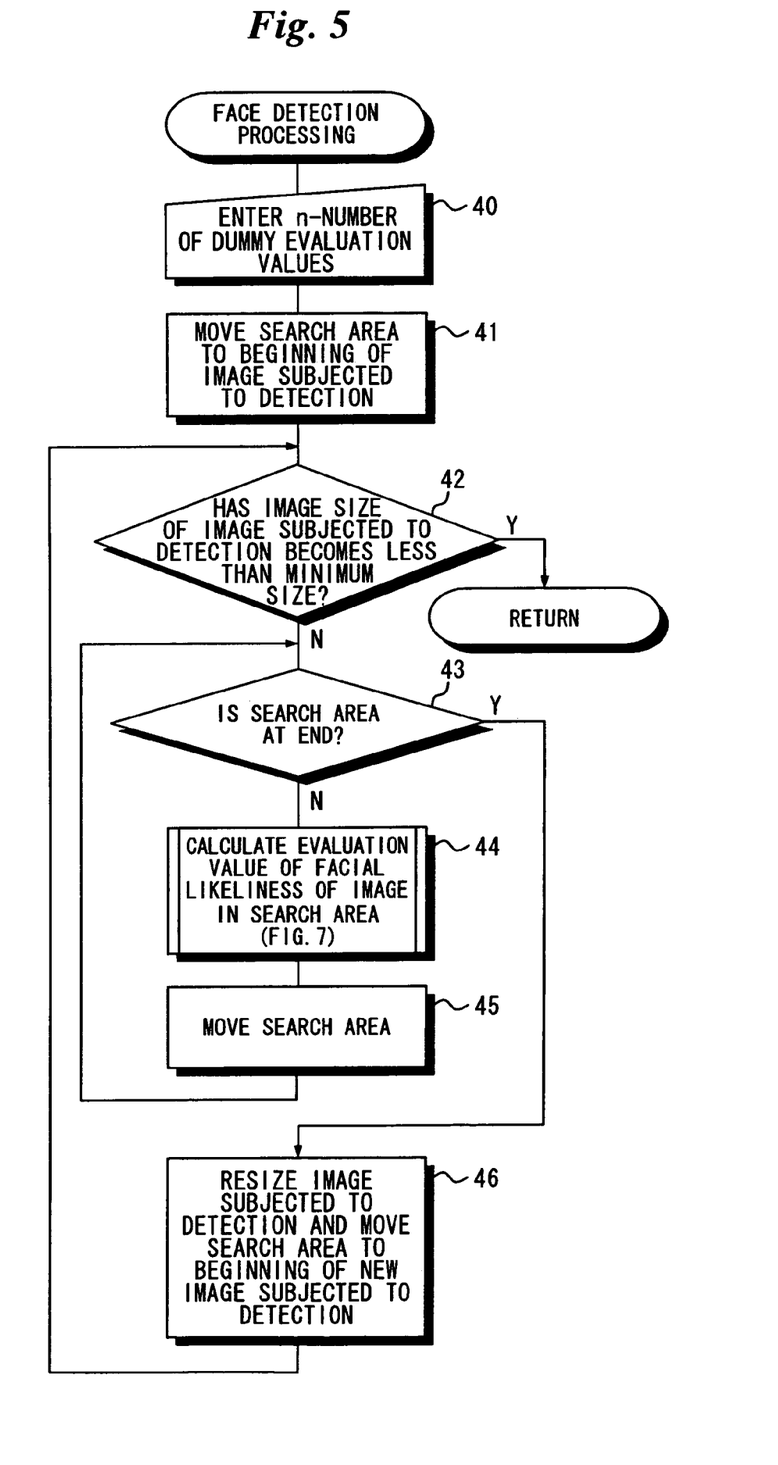
FIG. 5 is a flowchart illustrating processing for detecting a face.
Figure 6:
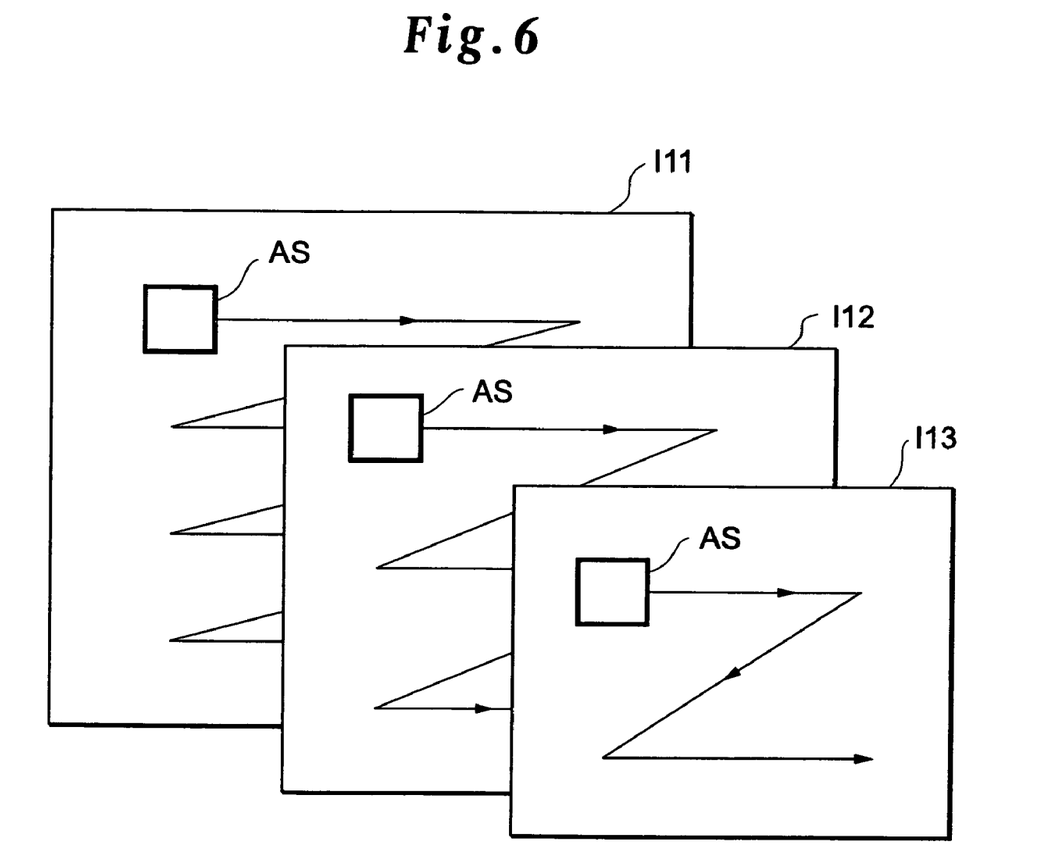
FIG. 6 illustrates the manner in which a detection-target image portion is searched using a search area.

FIG. 5 is a flowchart illustrating processing for detecting a face image, and FIG. 6 illustrates the relationship between the image of a subject (an image subjected to detection) and a search area.

This processing causes the image of the subject obtained by image sensing to be scanned by the search area and detects an evaluation value indicating the degree of matching between the image within the search area and the above-mentioned result of learning (detection data). The image within the search area is rotated in prescribed angular increments and processing for calculating an evaluation value is executed also at each prescribed angle through which the image has been rotated incrementally. The image of a portion specified as by the position, etc., of the search area for which the maximum evaluation value has been obtained is judged to be the image of a face.

First, n (four in the above-described example) dummy evaluation values (overall scores) of target images to be stored in the target-image information list are input (step 40). Further, a search area AS is moved to the beginning of a subject image (an image subjected to detection) (step 41). In this embodiment, the size of the image subjected to detection becomes gradually smaller and the image subjected to detection diminishes to a prescribed minimum image size. An evaluation value of facial likeliness is calculated with regard to the image within the search area AS at each size. It is determined, therefore, whether the image size of the image subjected to detection has become the prescribed minimum image size (step 42).

If the minimum image size has been attained ("YES" at step 42), processing for calculating the evaluation value will have been executed at various sizes of images subjected to detection and therefore the position of the image of the face in the subject image is decided based upon the obtained maximum evaluation value. If the minimum image size has not been reached ("NO" at step 42), then it is determined whether the search area is at the end of the image subjected to detection (step 43).

If the search area AS is at the end of the image subjected to detection ("YES" at step 43), evaluation value calculation processing regarding the image subjected to detection will have ended. Processing for resizing the image subjected to detection is executed, therefore, in such a manner that evaluation value calculation processing will be executed with regard to the target image of the next smaller size (step 46). Further, the search area AS is moved to the beginning of the image subjected to detection that has been resized. If the search area AS is not at the end of the image subjected to detection ("NO" at step 43), then an evaluation value indicating the facial likeliness of the image within the search area AS is calculated (step 44). The details of processing for calculating the evaluation value will be described later. When processing for calculating the evaluation value ends, the search area is moved a small distance in the horizontal and vertical directions (step 45). The processing of steps 43 and 44 is repeated.

Thus, when processing for calculating an evaluation value of facial likeliness regarding the image within the search area AS ends with regard to an initial image I11 subjected to detection, evaluation value calculation processing is repeated until the image size reaches the minimum image size, as by applying this processing to smaller image I12 subjected to detection and to still smaller image I13 subjected to detection.

Figure 7:
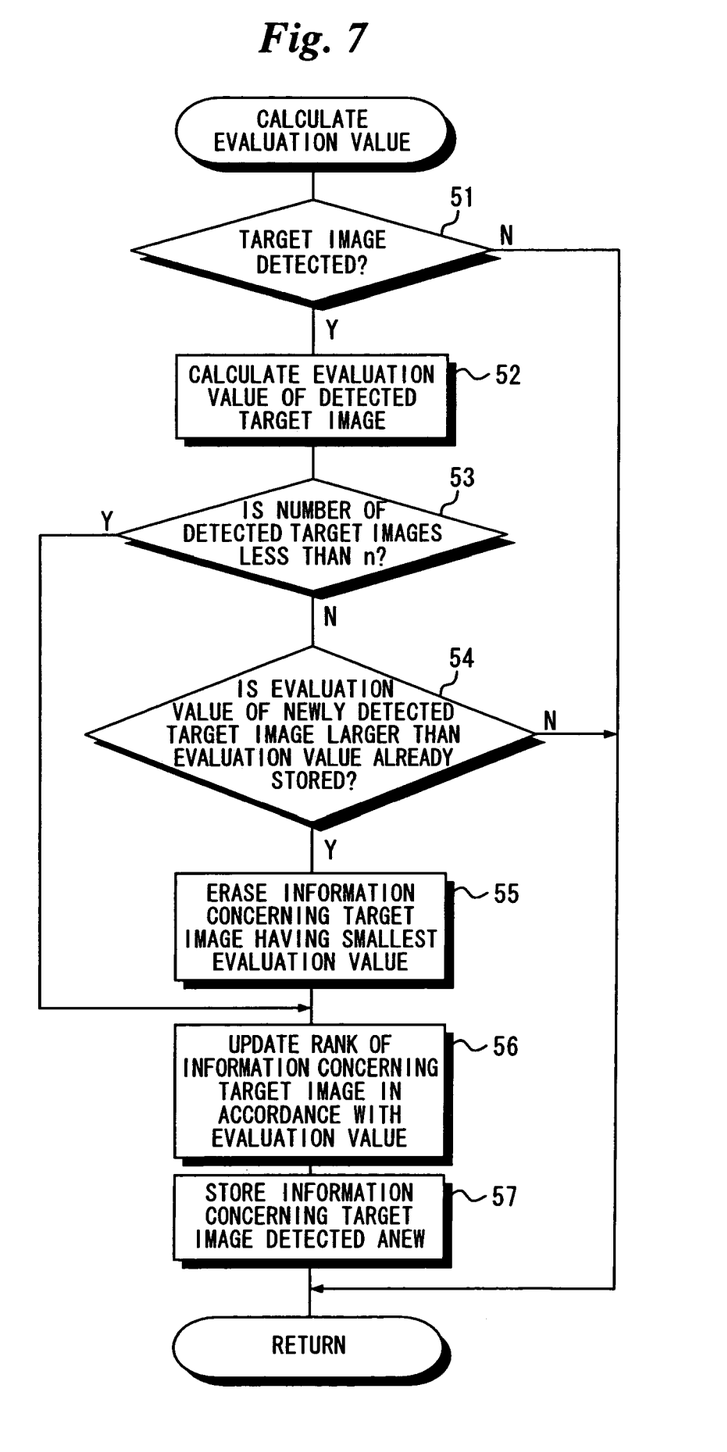
FIG. 7 is a flowchart illustrating processing for calculating an evaluation value.

FIG. 7 is a flowchart illustrating processing for calculating an evaluation value (the processing at step 44 in FIG. 5).

In this processing for calculating evaluation value, as mentioned above, information concerning the four highest ranking target-image portions in terms of evaluation value is stored in the target-image information list.

As mentioned above, the search area is scanned across the image subjected to detection and whether a target image has been detected or not is investigated (step 51). If a target image is detected ("YES" at step 51), the evaluation value (overall score) of the detected target-image portion is calculated (step 52). Of course, processing for calculating an evaluation value is skipped in a case where an evaluation value has already been detected at the moment the target-image portion is detected, as when an evaluation value is calculated and a target-image portion is detected based upon this evaluation value.

If the number of detected target-image portions exceeds n owing to detection anew of a target-image portion ("NO" at step 53), then it is determined whether the evaluation value of the newly detected target-image portion is larger than any evaluation value among evaluation values of information concerning target-image portions already stored in the target-image information list (step 54).

If the evaluation value of the newly detected target-image portion is smaller than any evaluation value among evaluation values of information concerning target-image portions already stored in the target-image information list ("NO" at step 54), then it is construed that the newly detected target image resembles the target-image portion to be found less than a target-image portion having information that has already been stored in the target-image information list. As a result, the information concerning the newly detected target-image portion is not stored in the target-image information list.

If the evaluation value of the newly detected target-image portion is larger than any evaluation value among evaluation values of information concerning target-image portions already stored in the target-image information list ("YES" at step 54), then this means the newly detected target image resembles the target-image portion to be found more than a target image portion having information that has already been stored in the target-image information list. As a result, the information concerning the newly detected target-image portion is stored in the target-image information list in accordance with processing set forth below.

First, among evaluation values of information concerning target-image portions stored in the target-image information list, the information of the lowest evaluation value is erased form the list (step 55). When this is done, the information concerning four target-image portions, inclusive of information concerning the newly detected target-image portion, can be stored in the target-image information list. The rank of information concerning the target-image portions is updated in order of decreasing evaluation value (step 56). The information concerning the newly detected target-image portion is stored in the target-image information list (step 57). Of course, it may be so arranged that rather than erasing information concerning target-image portions from the target-image information list in order of increasing evaluation value and updating the list, information concerning target-image portions is erased from the target-image information list in order of increasing reference value (size, brightness, saturation, position, orientation, inclination and hue, etc., of the detection-target image portion) that is in accordance with a prescribed criterion that is different from (or the same as) the evaluation value. In this case, it goes without saying that these reference values are detected as necessary and stored in the target-image information list.

If the number of detected target-image portions is less than n even if a target-image portion is detected anew ("YES" at step 53), the information concerning the newly detected target-image portion is stored in the target-image information list without erasure of information that has already been stored in the list.

Figure 8:
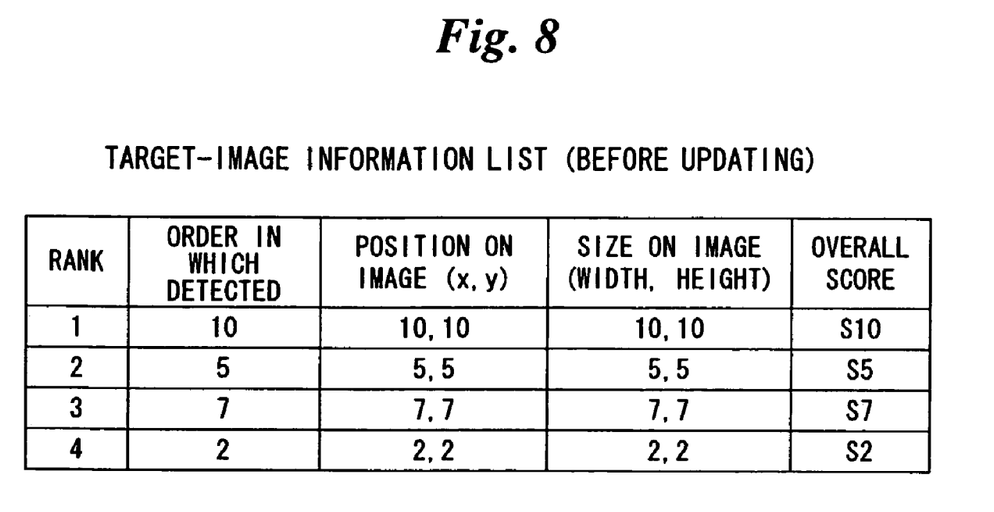
FIG. 8 illustrates an example of a list of items of target-image information.
Figure 9:
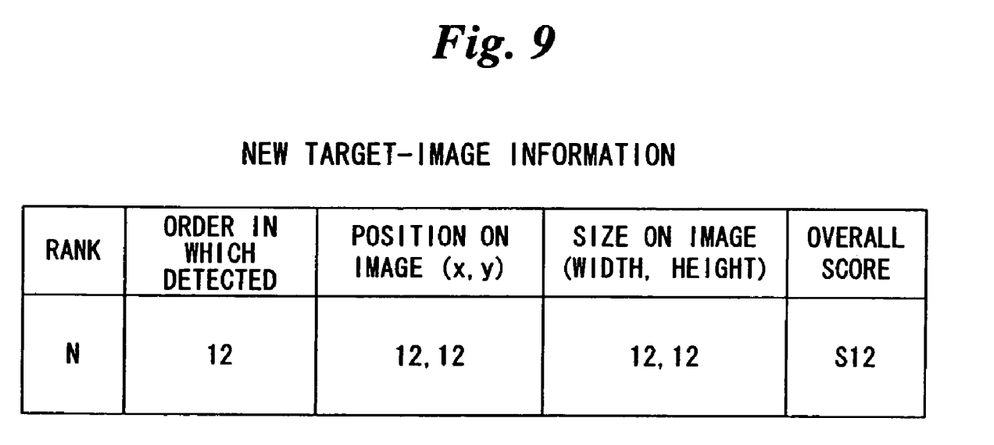
FIG. 9 illustrates an example of a list of new items of target-image information.

FIG. 8 illustrates an example of the target-image information list, and FIG. 9 illustrates an example of newly detected target-image information.

It is assumed here that the target-image information list shown in FIG. 8 has been stored in the memory 7. Information concerning four target-image portions has been stored in the list and ranked from 1 to 4. The first rank is information that was detected tenth, and the second, third and fourth ranks are items of information that were detected fifth, seventh and second, respectively. The values of the overall scores are related as follows in accordance with the above ranking: $S10>S5>S7>S2$.

It will be assumed here that a target-image portion having the information shown in FIG. 9 has been detected anew in a state in which the target-image information list shown in FIG. 8 has been stored.

As shown in FIG. 9, it is assumed that N is the rank of the information concerning the target-image portion detected anew. Further, the order in which this was detected is $12^{th}$ and the overall score is S12. It is assumed that the overall score S12 of the information concerning the newly detected target-image portion is smaller than the above-mentioned overall score S10 and larger than the overall score S5 ($S10>S12>S5$). Accordingly, the information of the fourth rank having the lowest evaluation value (overall score) in the information that has been stored in the target-image information list shown in FIG. 8 is deleted from the target-image information list. Further, in accordance with overall score, the information that was newly detected $12^{th}$ moves to the second rank, the information that was ranked second moves to the third rank, and the information that was ranked third moves to the fourth rank. As a result of the ranking of information concerning the target-image portions being thus updated, the target-image information list comes to contain the information concerning the four target-image portions as shown in FIG. 4.

Figure 10:
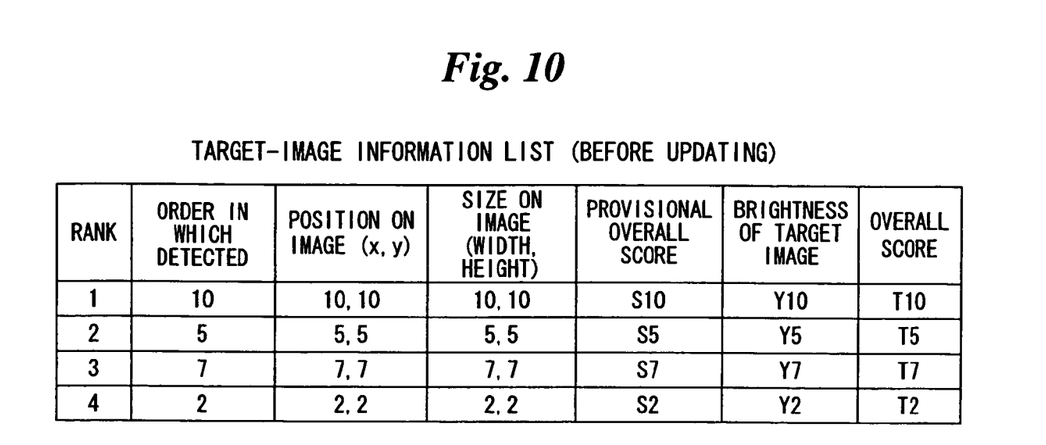
FIG. 10 illustrates an example of a list of items of target-image information.
Figure 11:
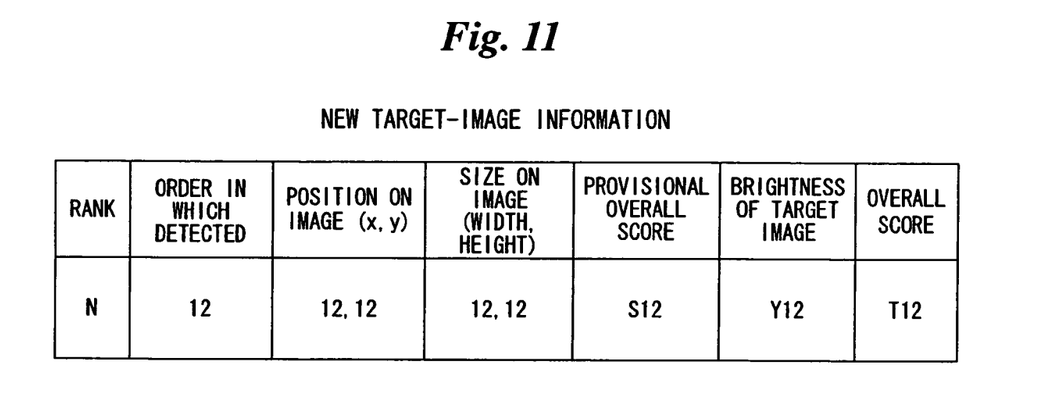
FIG. 11 illustrates an example of a list of new items of target-image information.
Figure 12:
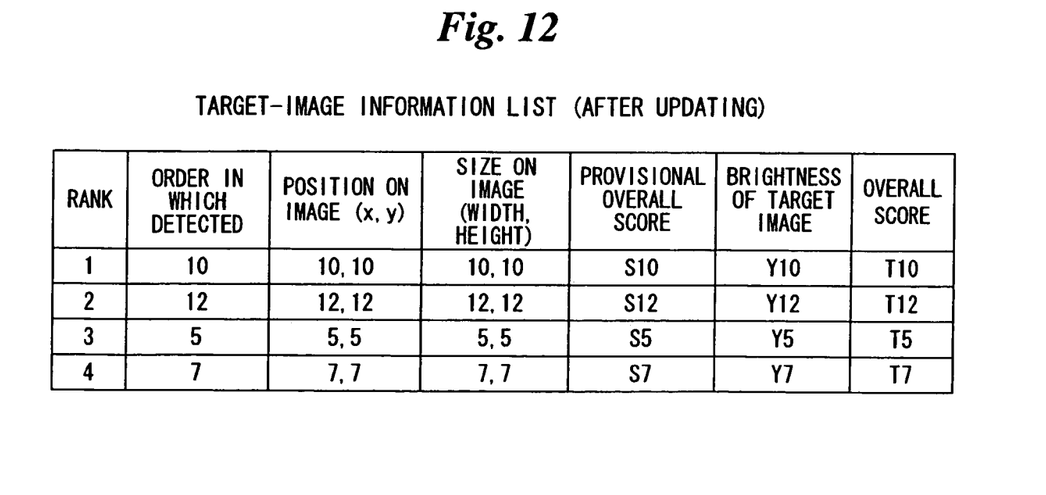
FIG. 12 illustrates an example of a list of items of target-image information.

FIGS. 10 to 12 illustrate a modification.

In the embodiment described above, the overall score indicative of an evaluation value is the result of summing scores that have been obtained. As illustrated next, however, it may be so arranged that weighting is applied to calculate the overall score indicative of evaluation value.

FIG. 10 illustrates a target-image information list prior to updating, FIG. 11 target-image information detected anew and FIG. 12 the target-image information list after updating.

As shown in FIG. 10, the target-image information list contains ranking, the order in which target-image portions have been detected, position on the image, size on the image and overall score, in a manner similar to that of the list shown in FIG. 8. In addition to these items of information that have been stored in the list of FIG. 8, the target-image information list of FIG. 10 also contains provisional overall score and brightness of the detected target image. The provisional overall score in FIG. 10 corresponds to the overall score in FIG. 8.

In this embodiment, overall score is calculated in accordance with the following equation:

$$\text{overall score} = \alpha \cdot f(\text{size on the image}) + \beta \cdot f(\text{provisional overall score}) + \gamma \cdot f(\text{brightness of target image})$$

The rank of a detected target-image portion is decided based upon the order of the obtained overall score. In the case of the example shown in FIG. 10, ranking has been decided in the following order: the target-image portion detected tenth, the target-image portion detected fifth, the target-image portion detected seventh and the target-image portion detected second. Accordingly, the values of the overall scores are related as follows: T10>T5>T7>T2.

It is assumed that a new target-image portion having total score T12 was detected $12^{th}$, as shown in FIG. 12, in a case where the target-image information list shown in FIG. 10 has been stored. Further, it is assumed that the overall score T12 and overall scores contained in the target-image information list are related as follows: T10>T12>T5. Accordingly, as shown in FIG. 12, the target-image information list is updated in such a manner that the $12^{th}$ newly detected target-image portion will take on the second rank. The information concerning the target-image portion detected second and having the lowest overall score is deleted from the target-image information list. This is similar to the situation described above.

Figure 13:
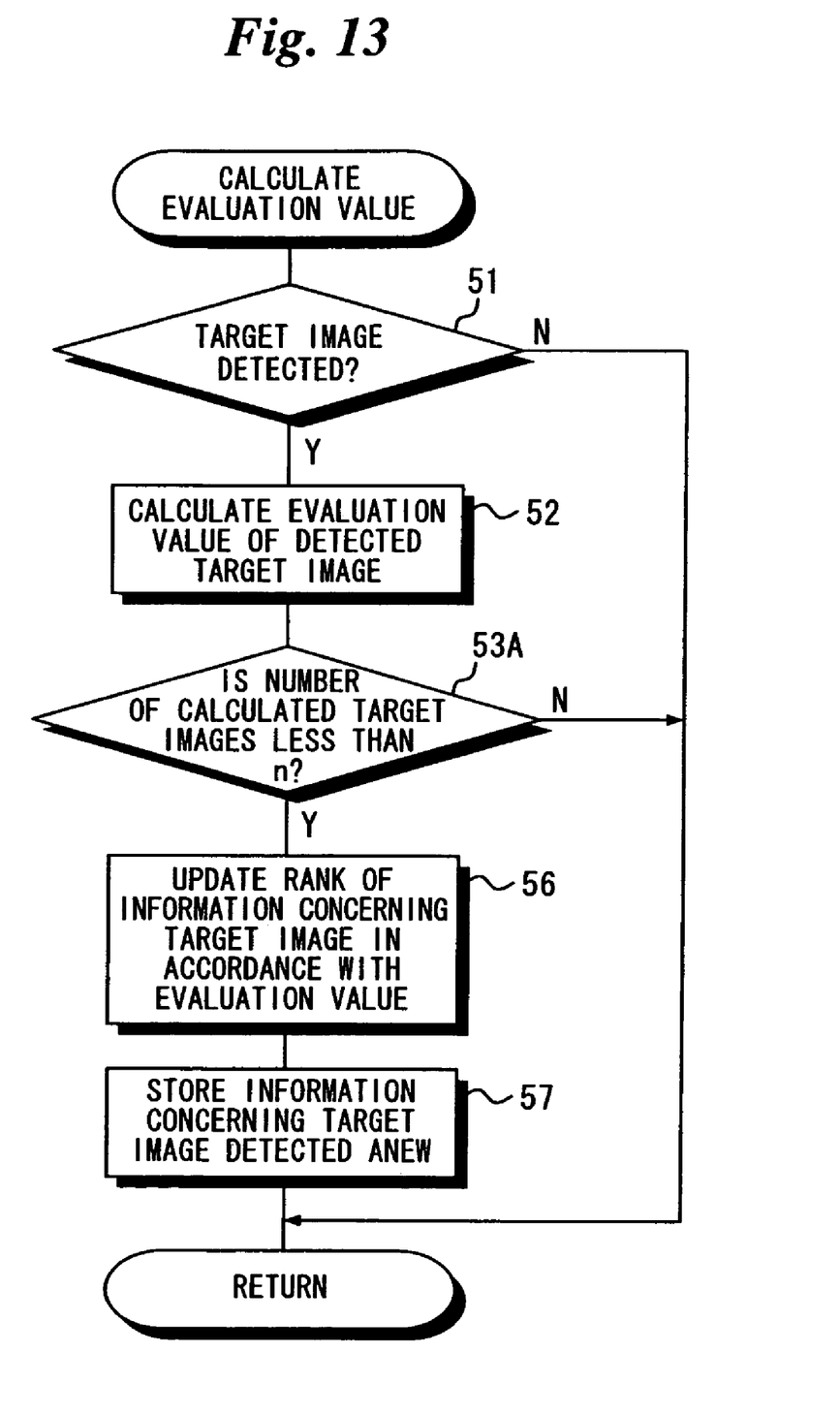
FIG. 13 is a flowchart illustrating processing for calculating an evaluation value.

FIG. 13 illustrates another modification and is a flowchart of processing for calculating evaluation value. This flowchart corresponds to that of FIG. 7 and processing identical with that of FIG. 7 is designated by like steps numbers and need not be described again.

The processing for calculating evaluation value shown in FIG. 7 is such that if the number of target-image portions detected exceeds n ("NO" at step 53 in FIG. 7), it is determined whether the evaluation value of the newly detected target-image portion is larger than any evaluation value that has already been stored (step 54 in FIG. 7). If the evaluation value is larger, the information concerning the lowest evaluation value is erased (step 56 in FIG. 7).

By contrast, the processing for calculating evaluation value shown in FIG. 13 is such that if the number of target-image portions detected exceeds n owing to detection of a target-image portion anew ("NO" at step 53A), then processing for calculating the evaluation value is terminated. Thus, the number of detected target-image portions can be prevented from exceeding n. This makes it possible to prevent a malfunction ascribable to the detection of a large number of target-image portions.

The above-described embodiment relates to processing for detecting face images. However, it goes without saying that the invention is applicable not only to processing for detecting face images but also to processing for detecting a redeye image and to other detection processing as well. Furthermore, processing for calculating evaluation value in the above-described embodiment is such that calculation is performed based upon a learning algorithm. However, it may be so arranged that information such as the size, brightness, saturation and hue of a target-image portion is utilized in this learning algorithm. It may be so arranged that information concerning target-image portions in excess of the number n is erased in order of increasing or decreasing value of these items of information.

As many apparently widely different embodiments of the present invention can be made without departing from the spirit and scope thereof, it is to be understood that the invention is not limited to the specific embodiments thereof except as defined in the appended claims.

What is claimed is:

1. An image search apparatus for searching for a detection-target image, comprising:

a detection device for finding a detection-target image portion, based upon an evaluation value indicating degree of detection-target likeliness, in an image subjected to detection;

a storage device for storing information concerning the detection-target image portion that has been found by said detection device;

a determination device for determining whether a number of detection-target image portions that have been found by said detection device is equal to or greater than a prescribed number; and an erasing device, responsive to a determination by said determination device that the number is equal to or greater than the prescribed number, for erasing detection-target image portions, which have been stored in the storage device, in order of increasing reference value that is based upon a prescribed criterion in such a manner that the number of detection-target image portions that have been found by said detection device will fall below the prescribed number.

2. The apparatus according to claim 1, wherein the evaluation value is based upon at least one among the size, brightness, saturation, position, orientation, inclination and hue of the found detection-target image portion.

3. The apparatus according to claim 1, wherein the detection-target image portion comprises a face image or redeye image.

4. The apparatus according to claim 1, further comprising:

a correction mode setting device for setting a correction mode, wherein said detection device finds the detection-target image portion in response to the correction mode set by said correction mode setting device.

5. The apparatus according to claim 1, further comprising:

an image sensing mode setting device for setting an image sensing mode; and an image sensing device for sensing an image of a subject in response to the image sensing mode set by said image sensing mode setting device and outputting an image data representing the image of the subject, wherein said detection device finds a detection-target image portion in the image of the subject represented by the image data outputted from said image sensing device in response to the image sensing mode set by said image sensing mode setting device.

6. The apparatus according to claim 5, wherein said image sensing device performs image sensing that precedes actual image sensing and actual image sensing, and said detection device finds a detection-target image portion in the image of the subject represented by the image data outputted from said image sensing device by the image sensing that precedes the actual image sensing and the actual image sensing.

7. The apparatus according to claim 1, further comprising:

a playback mode setting device for setting a playback mode; and a readout device for reading out an image data recorded on a recording medium in response to the playback mode set by said playback mode setting device, wherein said detection device finds the detection-target image portion in the image of the subject represented by the image data readout from said readout device in response to the playback mode set by said playback mode setting device.

8. The apparatus according to claim 1, further comprising;

a correction device for correcting the evaluation value, wherein the reference value comprises the evaluation value corrected by said correction device.

9. A method of controlling an image search apparatus for searching for a detection-target image, the apparatus having a detection device for finding a detection-target image portion, based upon an evaluation value indicating degree of detection-target likeliness, in an image subjected to detection, and a storage device for storing information concerning the detection-target image portion that has been found by the detection device, said method comprising:

determining whether a number of detection-target image portions that have been found by the detection device is equal to or greater than a prescribed number; and in response to a determination that the number is equal to or greater than the prescribed number, erasing detection-target image portions, which have been stored in the storage device, in order of increasing reference value that is based upon a prescribed criterion in such a manner that the number of detection-target image portions that have been found by the detection device will fall below the prescribed number.

* * * * *